United States Patent
Melville et al.

(10) Patent No.: US 8,703,668 B2
(45) Date of Patent: Apr. 22, 2014

(54) BEARING COMPONENTS AND PROCESSES FOR DEPOSITING ADDITIVES, ESPECIALLY FLUOROPOLYMERS, ON CELLULOSE

(75) Inventors: Andrew J. Melville, Cheshire (GB); David J. Topping, Merseyside (GB); David P. Willis, Downingtown, PA (US)

(73) Assignee: Whitford Ltd., Runcorn (GB)

( * ) Notice: Subject to any disclaimer, the term of this patent is extended or adjusted under 35 U.S.C. 154(b) by 813 days.

(21) Appl. No.: 12/527,150

(22) PCT Filed: Feb. 13, 2008

(86) PCT No.: PCT/GB2008/000499
§ 371 (c)(1),
(2), (4) Date: Dec. 9, 2009

(87) PCT Pub. No.: WO2008/099173
PCT Pub. Date: Aug. 21, 2008

(65) Prior Publication Data
US 2010/0086246 A1 Apr. 8, 2010

(30) Foreign Application Priority Data

Feb. 13, 2007 (GB) .................................. 0702795.6

(51) Int. Cl.
*C10M 177/00* (2006.01)
*B32B 23/04* (2006.01)
*B32B 27/00* (2006.01)

(52) U.S. Cl.
USPC ............................ 508/181; 428/532; 428/422

(58) Field of Classification Search
None
See application file for complete search history.

(56) References Cited

U.S. PATENT DOCUMENTS

| 3,560,065 | A | 2/1971 | Shobert et al. |
| 3,850,667 | A | 11/1974 | Tani et al. |
| 6,130,327 | A | 10/2000 | Wolf et al. |
| 6,911,054 | B2 | 6/2005 | Boeckh et al. |
| 2006/0134414 | A1 * | 6/2006 | Neuberg ....................... 428/372 |

FOREIGN PATENT DOCUMENTS

| DE | 10324232 A1 | 12/2004 |
| GB | 597909 | 2/1948 |
| GB | 1144048 | 3/1969 |
| GB | 1163423 | 9/1969 |
| GB | 1205079 | 9/1970 |
| GB | 1391011 | 4/1975 |
| GB | 2414425 A | 11/2005 |
| JP | 2006-312688 A | 11/2006 |
| WO | WO 98/58986 | 12/1998 |

* cited by examiner

Primary Examiner — Vishal Vasisth
(74) Attorney, Agent, or Firm — Faegre Baker Daniels LLP

(57) ABSTRACT

A method for applying an additive, e.g. a fluoropolymer, to cellulose. The method comprises a number of steps. First, solid cellulose, a solvent capable of dissolving cellulose, e.g. NMMO and a dispersion of the additive are brought into contact with each other. The additive is allowed to diffuse into the dissolved cellulose, which is possible as a result of the dissolution of the surface layer of the solid cellulose. The solubility of cellulose in the solvent is then reduced, whereby the additive that has diffused into the dissolved cellulose is incorporated into the resulting solid cellulose. A method for applying a fluoropolymer to cellulose as a surface coat is also described. Flexible bearing components comprising a mat of cellulose fibers and a fluoropolymer which may be made by the methods described.

5 Claims, 3 Drawing Sheets

BEARING COMPONENTS AND PROCESSES FOR DEPOSITING ADDITIVES, ESPECIALLY FLUOROPOLYMERS, ON CELLULOSE

RELATED APPLICATIONS

This application is a 371 of PCT/GB08/00499, filed Feb. 13, 2008.

The present application is a National Phase entry of PCT Application No. PCT/GB2008/000499, filed Feb. 13, 2008, which claims priority from Great Britain Application Number 0702795.6, filed Feb. 13, 2007, the disclosures of which are hereby incorporated by reference herein in their entirety.

TECHNICAL FIELD

The present invention relates to bearing components, especially flexible bearing components, having a bearing surface and comprising cellulose and a fluoropolymer and to methods for applying an additive, for example a hydrophobic fluoropolymer, to cellulose.

BACKGROUND ART

Cellulose is a readily available substance which can be used to manufacture a range of articles. There are a number of advantages to using cellulose when manufacturing articles, which include its relatively low cost, and the fact that it is environmentally friendly.

Fluoropolymers are well-known and can be used to modify materials, in particular the surface properties of manufactured articles. For example, it is common to apply fluoropolymers such as polytetrafluoroethylene (PTFE) to metal articles to obtain low surface-energy coatings imparting a lubricated and water-repellent character to the surface of the article, e.g. these coatings can be used to produce "non-stick" cookware or low friction bearings. However, it is difficult to apply some additives, including fluoropolymers, to cellulose-based articles, because cellulose degrades at the temperatures commonly required to process them.

Bearings are well known that include a bearing surface provided by a flexible sheet or tube, which is usually made of materials impregnated with a lubricant, such as wax, PTFE or oil. The sheet or tube is placed between the moving parts of the bearing and allows these parts to move relative to each other. This design is often used in bearings that are not subject to large forces, e.g. in the joints or support arms of car tailgates, air-cylinders rotary valves and actuators. If the bearing surface has deteriorated or become worn, the sheet or tube may be replaced.

Accordingly, there is a need for a bearing component that is cost-effective, robust, and universal to be used for various bearing surfaces, including different sizes, shapes, and applications, and in various environments and temperatures.

SUMMARY OF THE INVENTION

The present invention includes bearing components comprising cellulose and a fluoropolymer. While the bearing component may be any particular shape or size depending on the practical application, in one embodiment, the bearing component is a mat comprising cellulose fibres and a fluoropolymer adhered to the cellulose fibres located at a surface of the bearing component. The fluoropolymer may be in the form of a coating on the surface of the mat forming the bearing surface. The fluoropolymer may also be incorporated into the cellulose mat so that some of the fluoropolymer is present at the bearing surface.

A bearing component according to another embodiment of the present invention may comprise the fluoropolymer in the form of a coating on the cellulose fibres. In another embodiment, the fluoropolymer is incorporated into the surface of individual cellulose fibres. The bearing surface may be planar or tubular, and the bearing surface may be in a bearing.

The present invention also includes methods of applying fluoropolymer additives to solid cellulose materials. In one embodiment, the fluoropolymer additive can be adhered to cellulose fibres by applying a dispersion of the fluoropolymer onto a surface of the solid cellulose material and pressing or calendering the solid cellulose material. The dispersion may be applied at a controlled rate. In another embodiment, a dispersion of the fluoropolymer additive is brought into contact with cellulose dissolved in a solvent and the composition is altered such that at least a portion of the dissolved cellulose comes out of solution with the fluoropolymer additive incorporated into or adhered to the resulting solid cellulose.

BRIEF DESCRIPTION OF THE DRAWINGS

The invention may be carried into practice in various ways as described in the detailed description, with some embodiments described by way of example with reference to the following accompanying drawings.

DISCLOSURE OF THE INVENTION

Figure 1:
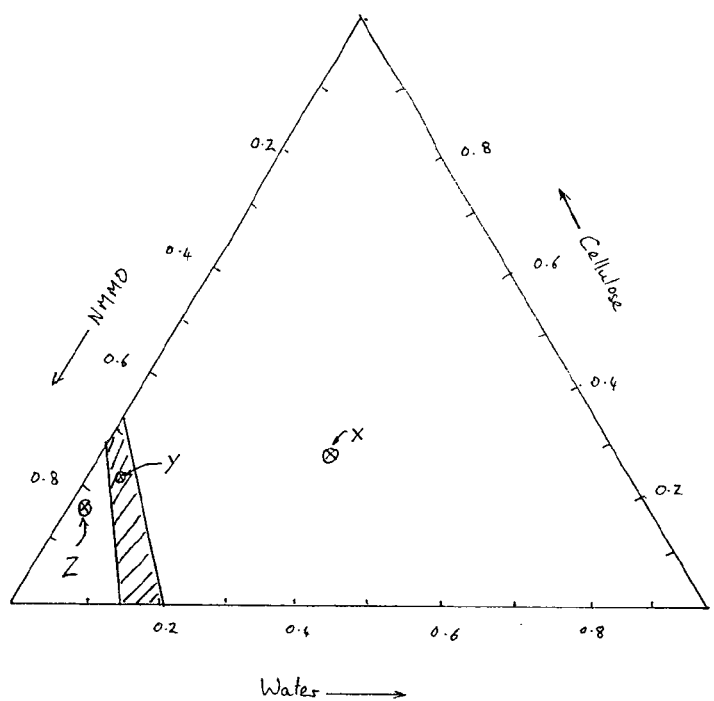
FIG. 1 is a phase diagram of water/NMMO/cellulose at standard temperature and pressure.

According to the present invention, there is provided a bearing component, especially a flexible bearing component, having a bearing surface, the bearing component comprising a mat comprising cellulose fibres and a fluoropolymer, wherein at least some of the fluoropolymer is located at the bearing surface and is adhered to the cellulose. Optionally, the fluoropolymer is coated on, or incorporated into the surface of, individual fibres of the mat.

The surface fluoropolymer may be in the form of a coat on the surface of the mat forming the bearing surface. Alternatively, the fluoropolymer may be incorporated into the cellulose mat so that some of the fluoropolymer is present at the bearing surface. The fluoropolymer may be present across the whole of the bearing surface or it may be discontinuous. This may be achieved by the method of applying a fluoropolymer to cellulose, as described below.

The mat may include materials other than cellulose fibres, for example reinforcing fibres made of other material, cellulose in a non-fibre form, e.g. powdered cellulose, as well as fillers, pigments, co-resins, dispersing agents and other additives used in paper-making art.

The component may be incorporated into any suitable known bearing to provide the bearing surface.

The bearing component may be any particular shape or size, depending on the practical application. The cellulose mat on which the bearing surface is formed may be flexible, stiff or rigid, e.g. it could be paper or cellulose board, depending on its application. An advantage of making a bearing component using a mat of cellulose fibres, e.g. paper, as a substrate, is that the cost of the bearing component is relatively low. Also, the bearing component according to the invention may be used for repairing worn bearing surfaces, either temporarily or permanently, and can easily be cut to size as required.

The bearing component according to the invention is useable at high temperatures, up to around 220° C.

Also according to the present invention, there is provided a method of applying a fluoropolymer to a mat comprising cellulose fibres, which method comprises the following steps:

(a) applying a dispersion of the fluoropolymer on a surface of the mat of cellulose fibres, and (b) pressing the mat of cellulose fibres, e.g. by calendering it, such that the fluoropolymer is coated onto, and adheres to, the surface of the cellulose mat.

The fluoropolymer may be PTFE, fluoroethylene-propylene (FEP), perfluoroalkoxy resin (PFA), perfluoromethyl vinyl ether (MFA), polyvinylidene fluoride (PVDF), ethylene tetrafluoroethylene (ETFE), ethylene chlorotrifluoroethylene (ECTFE), or tetrafluoroethylene-hexafluoropropylene-vinylidene fluoride (THV) or may be a mixture of these or other fluoropolymers.

The fluoropolymer may be in an aqueous dispersion and may be in the form of particles that typically have a particle size in the range of 50 nm to 10 µm; and the typical thickness of the cellulose fibres in the mat is 5 to 20 µm but larger or thinner fibres can also be used.

Step (a) may be carried out by means of directly applying the suspension to the cellulose fibre mat at a controlled rate, e.g. by spraying or using an application roller or doctor blade.

Step (b) is preferably carried out at a temperature of 150 to 250° C. at a pressure of 1,000 to 2,000 lb/sq in (6.9-13.8 MPa).

Steps (a) and (b) can take place successively on a continuous production line.

The invention also extends to cellulose products to which a fluoropolymer has been applied by the above method according to the invention.

According to another aspect of the present invention, there is provided a further method of applying an additive, e.g. a fluoropolymer, to cellulose, which comprises the following steps:

(a) bringing solid cellulose, a solvent capable of dissolving cellulose and a dispersion of the additive into contact with each other, such that a surface layer of the solid cellulose is dissolved in the solvent; the solvent may be a mixture of water and another liquid, e.g. NMMO, (b) contacting the dissolved cellulose with the additive, e.g. allowing to diffuse into contact with the dissolved cellulose, and (c) altering the composition, quantity or temperature of the solvent such that the solubility of cellulose in the solvent is reduced and at least a portion of the dissolved cellulose comes out of solution, whereby the additive that has contacted the dissolved cellulose is incorporated into, or adheres to, the resulting solid cellulose.

In one embodiment of this aspect of the present invention, the additive is hydrophobic, e.g. a fluoropolymer. However, the invention can be used to add any additive that is insoluble in the solvent and is especially useful to add water-insoluble additives to cellulose. For example, the additive may be a fluoropolymer, including but not limited to PTFE or the other fluoropolymers mentioned above or a mixture of these or other fluoropolymers. The contact time, i.e. the duration of method steps (a) and (b), may be of the order of 10 minutes, but may be shorter or longer depending on the particular conditions.

The additive may be combined with the solvent before carrying out the step (a) or it may be added once the solvent is in contact with the cellulose. Preferably, the additive is in the form of a micropowder or dispersion grade particles, dispersed in a medium such as water. The additive particles may be round, rod-shaped or plate-like, or the additive may be fibrous.

The solvent may be a mixture of two liquids, e.g. water and another liquid; the mixture may be such that the solubility of cellulose in the mixture is dependent on the relative amounts of the two liquids in the mixture, for example the solvent may be capable of dissolving cellulose only within a restricted compositional range of the solvent mixture. This allows the cellulose to be brought out of solution in step (c) by altering the relative amounts of the two liquids. The alteration can for example be achieved by heating the mixture whereby the liquid with the lower boiling point will evaporate more rapidly than the other, thereby increasing the concentration of the latter in the solvent.

The solvent may be a mixture of water and a cyclic amine oxide, such as those disclosed in GB-1144048 and U.S. Pat. No. 4,246,221. Of these, NMMO is preferred since it is commercially available.

It is known from GB-1144048 that aqueous N-methylmorpholine N-oxide (NMMO) and other cyclic amine oxides will dissolve cellulose when mixed with water and this property is exploited in the spinning of cellulose yarn (see for example U.S. Pat. No. 4,246,221). The use of aqueous NMMO in industrial processes has a number of advantages. NMMO has low toxicity and when it is used as a solvent it is possible to recycle it around the process streams. 50% solutions of NMMO in water are commercially available from the Huntsman Corporation of 10003 Woodloch Drive, The Woodlands, Tex. 77380, USA.

FIG. 1 is a phase diagram of water/NMMO/cellulose at standard temperature and pressure. The shaded region indicates the concentrations at which an aqueous solution of NMMO dissolves cellulose. Outside the shaded area, cellulose exists as a solid. Within the shaded area, cellulose can also exist as a solid if present in excess, e.g. >12 wt % cellulose.

One embodiment of this aspect of the present invention deserves special mention, namely the embodiment in which the solvent is a multi-component system (i.e. containing at least two components) and cellulose is soluble in the system only when the relative amounts of the components lie within restricted ranges; this will be described with reference to a water/NMMO solvent system, which is given by way of example only and it should again be borne in mind that other solvents can be used instead: In step (a) of the method, a water/NMMO mixture is brought into contact with cellulose and the amounts of water/NMMO are adjusted (if necessary) so that the mixture lies in the shaded area of the phase diagram of FIG. 1, in which a surface layer of the cellulose dissolves in the solvent mixture. It is believed that the shaded area of FIG. 1 corresponds to the area where NMMO monohydrate exists. The additive, which may be added to the water/NMMO mixture before or after contact with the cellulose, can then diffuse into contact with the cellulose solution. In step (c), the amounts of water and NMMO are adjusted to take the water/NMMO mixture out of the shaded area of the phase diagram in FIG. 1, which causes the previously dissolved cellulose to come out of solution and fixes the additive within the cellulose. The adjustment of the amounts of water and NMMO in the solvent may be achieved by:

(i) heating the water/NMMO mixture, e.g. to a temperature of 80-100° C. Since water is more volatile than NMMO, water will be preferentially evaporated and the concentration of NMMO in the mixture will increase until the water/NMMO mixture falls outside the shaded area of FIG. 1.

(ii) driving off both water and NMMO so that the amount of solvent is insufficient to dissolve the cellulose or (iii) adding either NMMO or water. Possibility (iii) has the disadvantages of increasing the amounts of ingredients used, causing difficulties with mixing and control of the process, and hindering the step of separating the cellulose from the water/NMMO.

When it is not possible to cause the cellulose to come out of solution by altering the relative amounts of the components in a multi-component solvent system, e.g. if a simple one-component solvent is used, option (ii) will generally be available to cause at least a portion of the dissolved cellulose to come out of solution.

When the solvent is NMMO, the amounts of water and NMMO in step (a) will generally be about 16 to 21% water and 79 to 84% NMMO in order to dissolve cellulose, assuming that, apart from cellulose, no other materials are present. However, if there are other materials present, these proportions may be different.

It is possible to use the method on solid cellulose in any form, for example either on cellulose which has already been formed into a product such as paper, or on loose cellulose fibres. In this way it may be possible to modify the surface of cellulose fibres which may subsequently be incorporated into new paper products.

This method of the present invention may be performed on paper and other ready-formed cellulose products. An advantage of performing the method on cellulose already formed into paper is that it is possible to provide the additive in chosen discrete regions, surfaces and areas of the paper, whereby part of the paper is treated by the method while others are not. For example, if the additive is only required on the surface of a non-absorbent paper and not throughout the thickness of the paper, the selective application of the solvent and additive only to the surface of the paper means that only the cellulose at the surface incorporates the additive, which prevents waste of the additive materials used. At the same time, it allows the bulk properties of the paper, such as strength and density, to be retained. As a further example, it is possible to provide the additive to only one side of a piece of paper using the method of the present invention so that the two sides have different properties.

After the additive has been incorporated into the cellulose, any remaining solvent may be removed from the solidified cellulose by washing with water; in the case of NMMO this is readily achieved since it is hygroscopic and is readily diluted by water. Generally excess cold water will be used to remove the remaining solvent mixed in with the cellulose. The washing process is preferably such that the concentration of the solvent at the surface of the cellulose does not give rise to a solvent mixture that will dissolve a substantial amount of cellulose, or does so only fleetingly.

The process stream containing the solvent, e.g. NMMO, can be recovered and recycled for repeated use in the method of the present invention.

After washing is completed, the cellulose may be dried to remove water and residual solvent, resulting in cellulose or a cellulose-containing article, e.g. paper, having the additive, e.g. fluoropolymer, incorporated into the surface of the solid cellulose. If the product is a paper, it may then be processed further, for example by calendering to smooth and compress the paper, or by other standard paper processing procedures.

The invention also extends to products comprising solid cellulose to which an additive has been applied by this method according to the invention.

In one embodiment of this method according to the invention, an aqueous solution of NMMO is contacted with solid cellulose in the form of paper, in the presence of an aqueous dispersion of fluoropolymer particles. The concentration of NMMO in the solution is increased by evaporation of water, to approach the concentration at which cellulose is dissolved (i.e. the shaded area of FIG. 1). The surface layer of the solid cellulose in contact with the mixture then dissolves and the fluoropolymer diffuses throughout the liquid phase. Further water is then driven off so that at least some of the dissolved cellulose comes out of solution; the NMMO is then washed off and the paper is dried.

In the various aspects of the present invention where an additive, e.g. a fluoropolymer, is present on the surface of a cellulose substrate, the thickness of the additive layer may generally be of the order of 0.1 to 100 μm, e.g. 1 to 50 μm, whether the layer has been calendered or not.

Example 1

An initial mixture of water and NMMO was combined with an aqueous dispersion of fluoropolymer particles, in the following proportions, where all percentages are expressed by weight:
35% of a dispersion of PTFE particles (Dyneon 5035 PTFE dispersion, particle size 200 nm)
55% of a commercially available NMMO solution in water containing 55% NMMO
10% de-ionised water.

A batch of 223 g of this mixture composition was made up.

The mixture was placed in a rotary evaporator to remove water from the mixture. The pressure in the flask was lowered and a water bath was used to heat the mixture to 88° C. The rotary speed was 100 revolutions/min. The water was removed slowly to avoid foam generation. 123 g of water was removed. The concentration of NMMO in the resulting mixture was in the shaded area of FIG. 1 and was capable of dissolving solid cellulose, and the viscosity of the mixture was suitable for easy application to paper.

The concentrated mixture was applied to the surface of dense, brown paper using an applicator bar. The concentrated mixture may be at room temperature or at an elevated temperature. The coated paper was then dried in an oven at 100° C. for 10 minutes to remove further water, which causes at least some of the dissolved cellulose to solidify, i.e. come out of solution. Remaining NMMO was then washed away under a running tap for approximately 5 minutes. The paper was re-dried using a photodryer to avoid the paper shrinking or creasing, with the photodryer set at 100-120° C. for a further 10 minutes. The dried paper was then calendered.

The coated paper produced contains PTFE particles, concentrated near the paper surface.

Example 2

A 50% solution of NMMO in water was placed in a rotary evaporator and 18.9% of the water was removed, leaving a solution containing 55% NMMO. The resulting solution was then combined with a dispersion of fluoropolymer particles in the following proportions:

77% NMMO solution (containing 55% NMMO)
23% of a PTFE particle dispersion having the same composition as that used in Example 1.

The concentration of the NMMO solution before incorporation of the fluoropolymer dispersion reduces foaming during evaporation in the rotary drier, as compared to the concentration of the NMMO solution in the presence of the fluoropolymer described in Example 1.

The mixture of these components was applied to the paper surface in the same way as in Example 1, but the concentration of NMMO in the mixture was too low to dissolve the cellulose since it is about at point X in the phase diagram of FIG. 1. During a first drying step, which was conducted in an oven at 100° C., water was driven off and the concentration of NMMO was increased until eventually it was sufficient to dissolve the cellulose in the paper, e.g. it had a concentration of approximately point Y in FIG. 1. This was in contrast to the method of Example 1 where the concentration of NMMO was adjusted to one capable of dissolving cellulose before application to the paper.

The drying was continued until the amount of water driven off was below the shaded area in FIG. 1, e.g. to point Z, where the dissolved cellulose had come out of solution. The paper was then washed, re-dried and calendered as described in Example 1.

Figure 6:
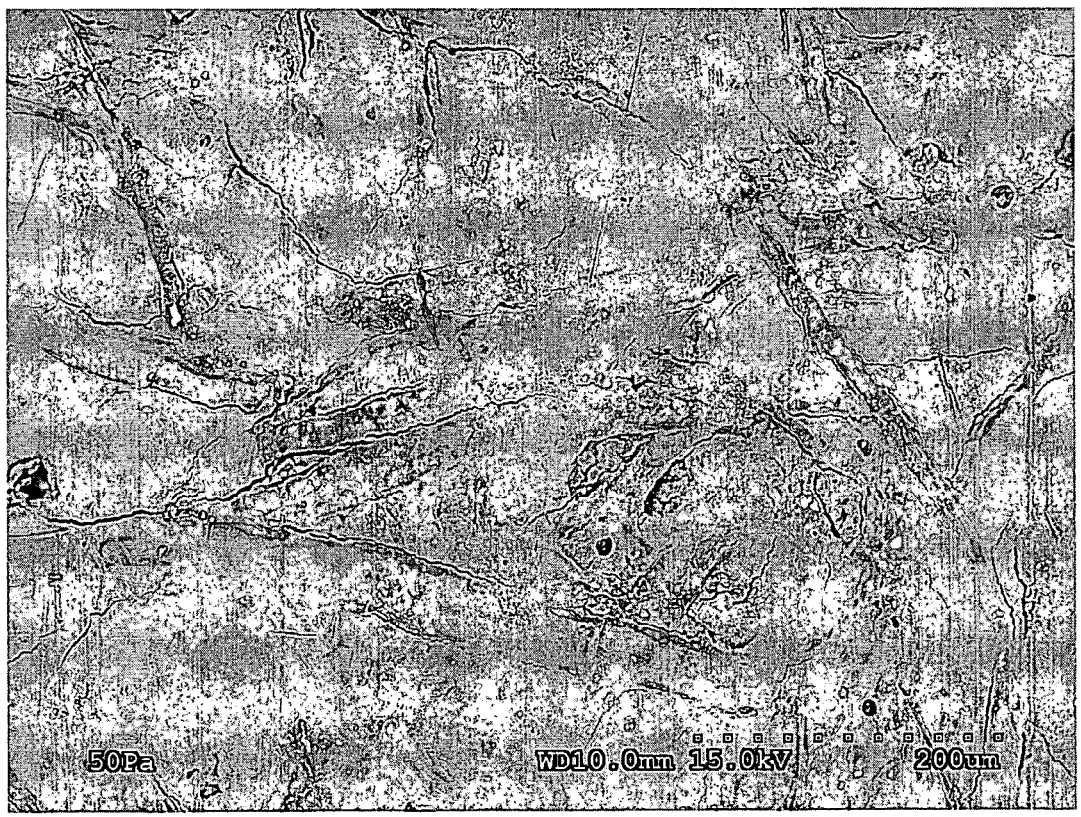
FIG. 6 is a scanning electron micrograph of PTFE coated on paper using deposition from NMMO with the micrograph taken after calendering.

As in Example 1, the coated paper produced contains PTFE particles, concentrated near the paper surface. A scanning electron micrograph (SEM) of the PTFE coated paper after calendering is shown in FIG. 6.

Example 3

A length of dense, brown paper was fed through a calendering apparatus having a pair of flat calendering rollers. Immediately prior to passing between the calendering rollers, an aqueous dispersion of the PTFE was applied at room temperature to the surface of paper using an applicator bar to provide a layer of PTFE suspension approximately 6 μm thick. The aqueous dispersion had the following composition:
    35% of a dispersion containing 60% PTFE particles (Dyneon 5035 PTFE dispersion, particle size 200 nm)
    65% de-ionised water.

After the paper was coated, it was passed through the calendering rollers where it was subject to a pressure of 1,000 to 2,000 lb/sq in (6.9-13.8 MPa) at a temperature of 150 to 250° C. During the calendering step, the deposited PFFE is caused to flow over the surface of the paper and in this way is coated onto, and adheres to, the surface of the paper.

Figure 2:
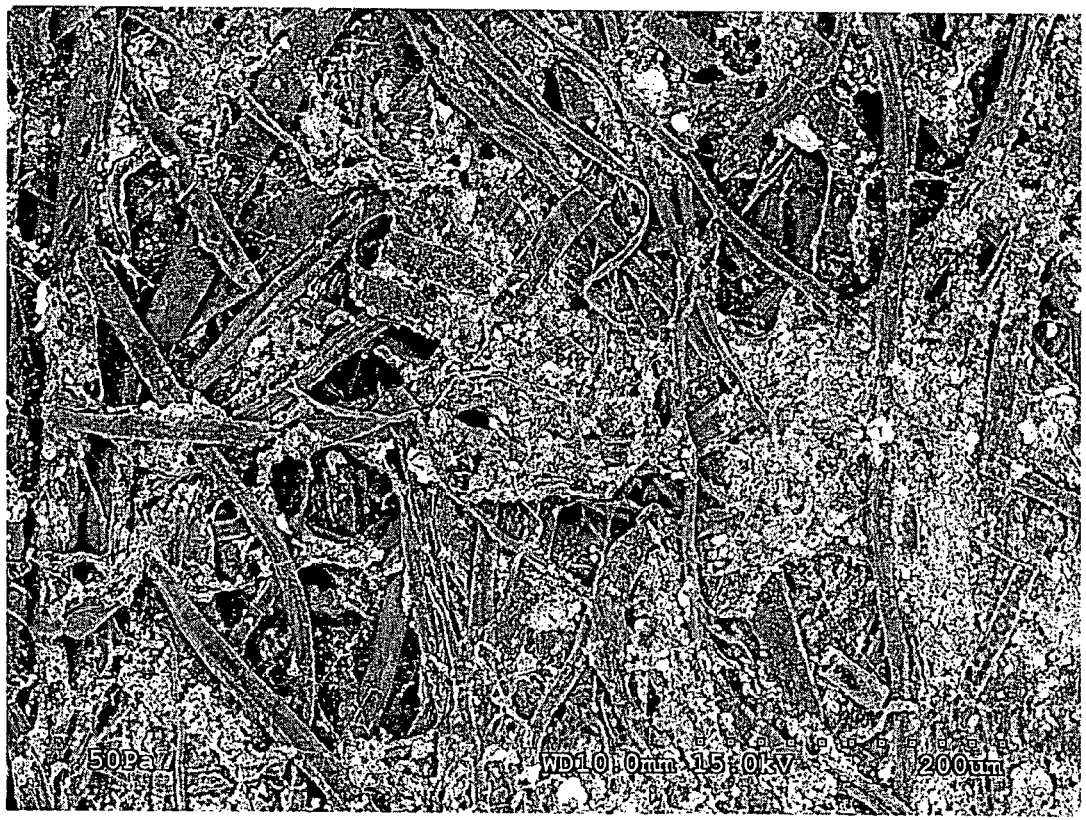
FIG. 2 is a scanning electron micrograph of paper before calendering.
Figure 3:
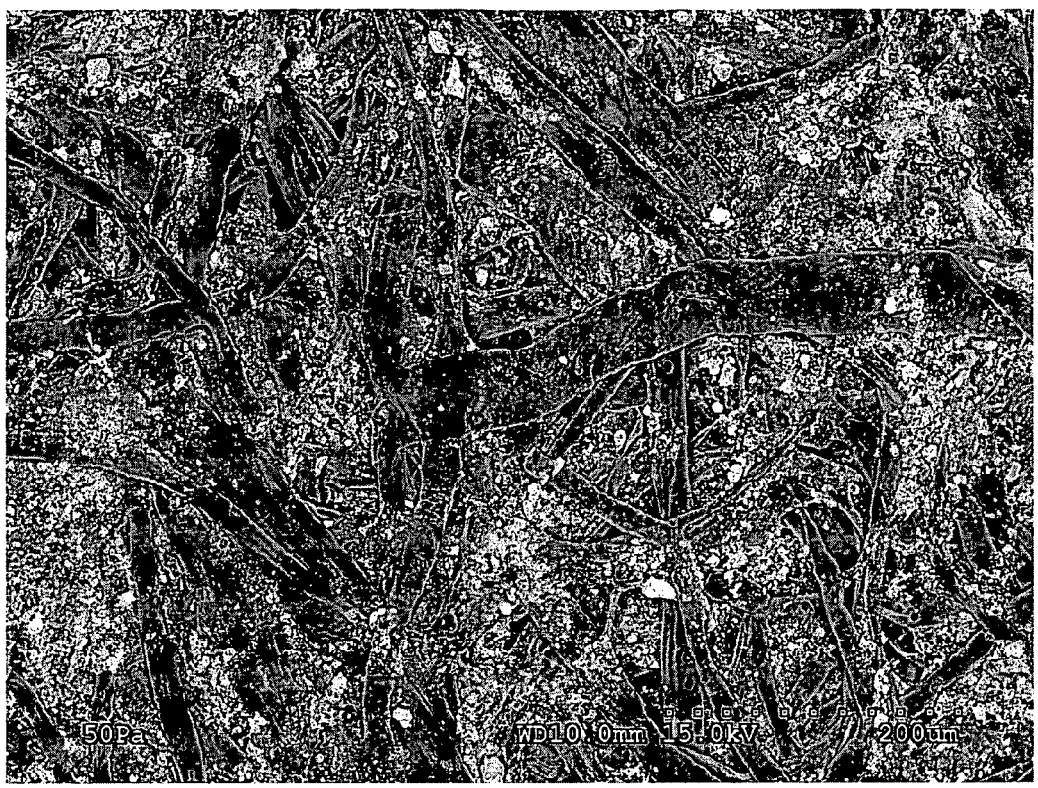
FIG. 3 is a scanning electron micrograph of the paper of FIG. 2 after calendering.
Figure 4:
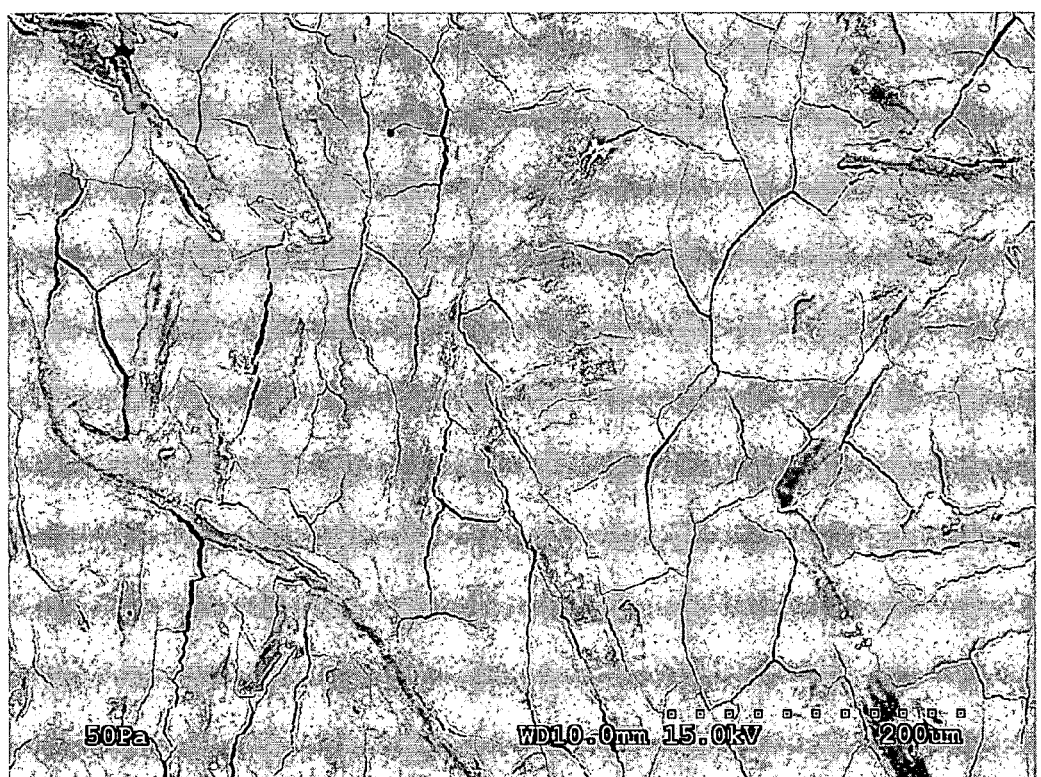
FIG. 4 is a scanning electron micrographs of PTFE coated on paper before calendering.
Figure 5:
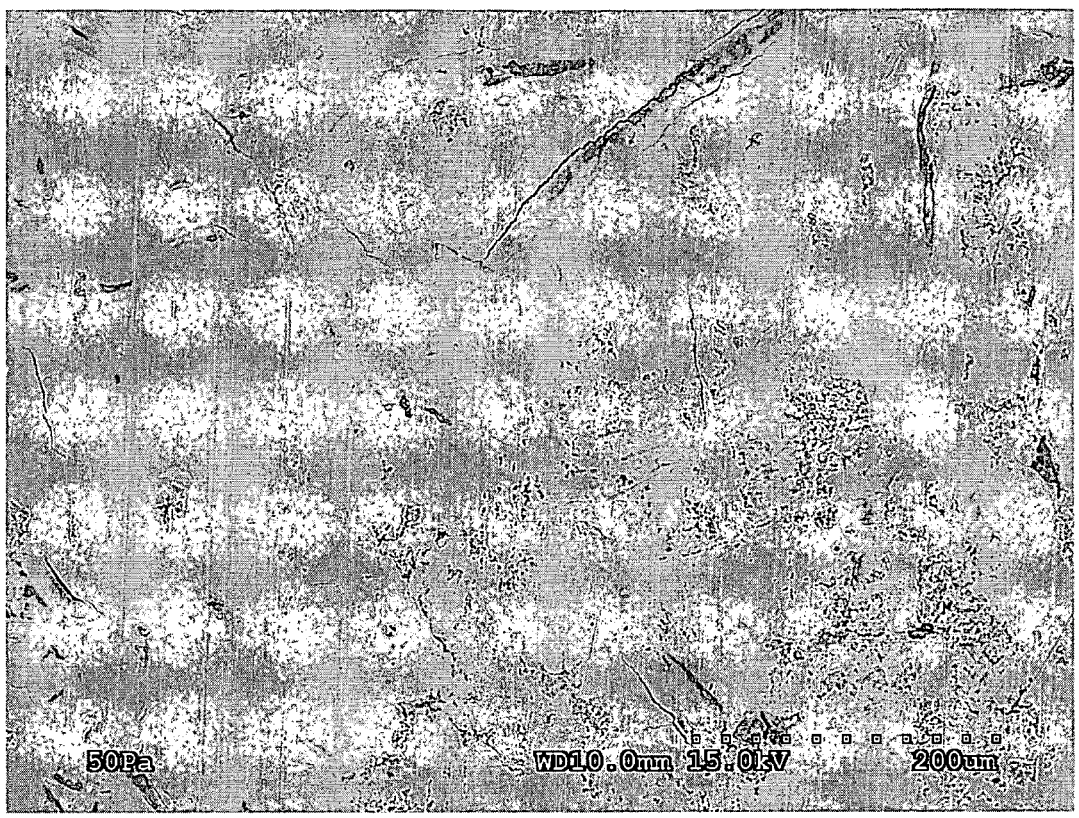
FIG. 5 is a scanning electron micrographs of PTFE coated on paper of FIG. 4 after calendering.

FIGS. 2 and 3 are SEMs of the paper before and after calendering (respectively); FIGS. 4 and 5 are scanning electron micrographs of the PTFE-coated paper taken before and after calendering (respectively). As can be seen the calendered PTFE is flat and uniform.

The paper can be cut into discs using an industrial cutter or cut and rolled into cylinders to provide flexible bearing component; the PTFE surface provides an excellent bearing surface. In an emergency, where a bearing surface has failed, the sheet could be cut to shape, e.g. even using a pair of scissors, and inserted into the bearing to provide a temporary bearing surface that can be used for a time, possibly until a replacement spare part is obtained.

Example 4

The calendered PTFE coated paper made by the NMMO process of Example 2 and shown in FIG. 6 was tested by cutting out a disc-shaped piece and adhering it onto a correspondingly shaped aluminium alloy disc so that the PTFE faced outwardly; the disc carrying the PTFE paper was pressed against a further aluminium alloy disc and rotated at controlled speeds. During a series of tests, the coated paper was pressed against the plate with a pressure of 1 MPa and rotated at speeds varying from 20 to 200 rpm. The PTFE surface of the paper was not worn in these tests and just appeared slightly polished.

The pressure velocity (PV) level of the PTFE paper was measured at 200 rpm and was found to be 0.29 MPa·m/sec, which is well above the PV limit of many plastic bearings. The PV Level of typical plastic bearings materials is as follows:

| | |
|---|---|
| nylon: | 0.13 |
| polycarbonate: | 0.11 |
| unfilled PTFE: | 0.04 |
| unfilled acetal: | 0.11 |
| phenolic resins: | 0.18 |

The invention claimed is:

1. A bearing component comprising:
a mat having a bearing surface, wherein the mat comprises cellulose fibres, wherein the bearing surface comprises cellulose fibres and a fluoropolymer wherein the fluoropolymer of the bearing component being located at the bearing surface with at least some of the fluoropolymer being incorporated into the surface of the cellulose fibres at the surface of the bearing component and wherein the fluorpolymer located at the bearing surface of the bearing component having a thickness in the range of about 0.1 microns to about 100 microns.

2. The bearing component according to claim 1, wherein at least some of the fluoropolymer is in the form of a coat on the cellulose fibres at the surface of the bearing component.

3. The bearing component according to claim 1, wherein the fluoropolymer is selected from the group consisting of polytetrafluoroethylene (PTFE), fluoroethylene-propylene (FEP), perfluoroalkoxy resin (PFA), perfluoromethyl vinyl ether (MFA), polyvinylidene fluoride (PVDF), ethylene tetrafluoroethylene (ETFE), ethylene chlorotrifluoroethylene (ECTFE), or tetrafluoroethylene-hexafluoropropylene-vinylidene fluoride (THV) and a mixture thereof.

4. The bearing component according to claim 1, wherein the bearing surface is planar or tubular.

5. The bearing component according to claim 1, wherein the bearing component is a bearing surface in a bearing.

* * * * *